United States Patent [19]
McCord

[11] 3,785,451
[45] Jan. 15, 1974

[54] FLEXIBLE AND FIREPROOF AUTOMOBILE DIAPER

[75] Inventor: John T. McCord, Phoenix, Ariz.

[73] Assignee: Andrea S. Ghigo, Glendale, Ariz. ; a part interest

[22] Filed: Aug. 4, 1972

[21] Appl. No.: 277,983

[52] U.S. Cl................... 180/69.1, 161/43, 161/99, 161/145
[51] Int. Cl. ...... B32b 1/04, D04h 1/14, B32b 3/04, B62d 25/20
[58] Field of Search..................... 161/43, 99, 145; 180/69.1

[56] References Cited
UNITED STATES PATENTS

| | | | |
|---|---|---|---|
| 2,732,024 | 1/1956 | Schonwald | 180/69.1 |
| 3,454,124 | 7/1969 | Niedek | 180/69.1 |
| 3,279,557 | 10/1966 | Halun | 180/69.1 |
| 2,171,813 | 9/1939 | Stockstrom | 180/69.1 X |
| 1,630,639 | 5/1927 | Taylor | 180/69.1 X |
| 3,674,613 | 7/1972 | Lavigne | 161/99 X |

Primary Examiner—Philip Dier
Attorney—Eric P. Schellin et al.

[57] ABSTRACT

This specification discloses an automobile diaper that is secured in position under an automotive device which contains oil under pressure and which presents the liability of oil dripping therefrom. The diaper is rectangular is shape, fireproof, and comprises a double-layer envelope which receives a mass of absorbent material. The inner layer is plastic and one panel thereof is formed with an opening leaving a marginal portion thereabout. The outer layer is of fiberglass and covers the opening. The envelope is provided with grommets along its edges which accommodates means for securing the diaper in position.

6 Claims, 4 Drawing Figures

PATENTED JAN 15 1974  3,785,451
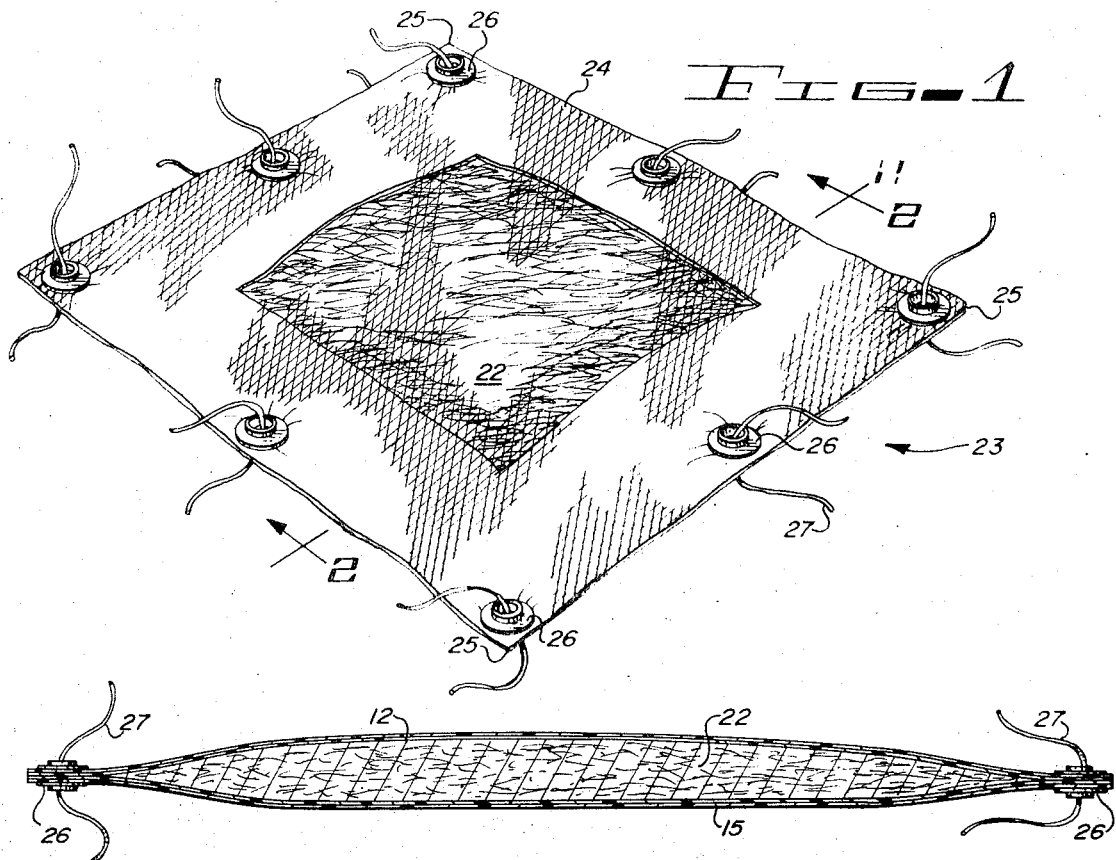
FIG-1
FIG-2
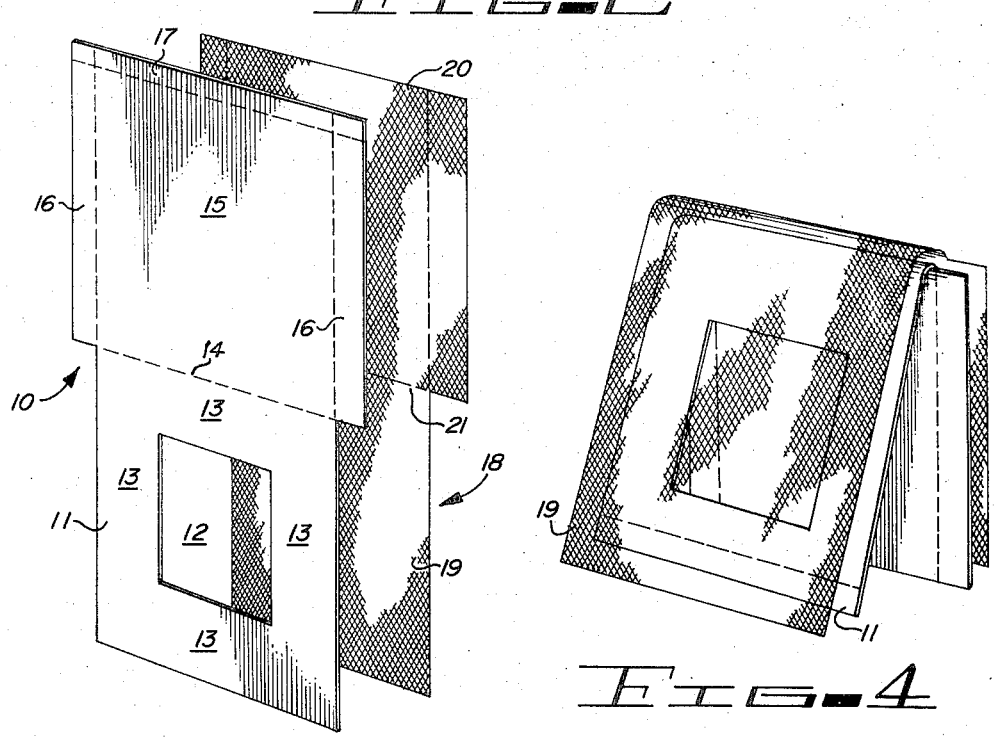
FIG-3
FIG-4

FLEXIBLE AND FIREPROOF AUTOMOBILE DIAPER

The present invention relates to so-called automobile diapers which are secured in position in an automobile under a device which contains oil under pressure and which presents the liability of oil dripping therefrom. The invention is concerned primarily with a diaper which is flexible and which is fireproof to a high degree.

BACKGROUND OF THE INVENTION

The modern automobile includes certain mechanisms or devices which receive oil under pressure. These are: the oil pan beneath the engine, the transmission, the differential and the power steering. Each of these devices presents the liability of oil dripping therefrom which is a highly undesirable nuisance, particularly when cars are parked in carports, garages, driveways and the like. When automobiles are left immobile for long periods, dripping oil will collect, and in many instances, the amount of such oil will be large. This creates a nuisance factor of a considerable degree.

The above noted conditions have been generally recognized and considerable inventive effort has been directed to the end of providing an oil absorbing member beneath the particular automotive device. Many of such known devices include a rigid tray or plate which carries a pad of oil-absorbent material. Such an arrangement presents certain factors which are highly undesirable. One of these is the fact that the plate or tray is not flexible to the degree necessary for the easy and accurate mounting thereof in its most effective position. A second and perhaps more important of these undesirable factors is that the absorbent pad is exposed and thus presents a fire hazard because of oil being highly inflammable.

Another undesirable feature attending devices of this type is the high cost attending the manufacture thereof.

OBJECTS OF THE INVENTION

With the foregoing conditions in mind, the present invention has in view the following objectives:

1. To provide an automobile diaper of the character indicated which is flexible and fireproof.
2. To provide an automobile diaper of the type noted which consists essentially of a double-layer envelope, one panel of which is formed with an opening and a mass of oil-absorbent material in said envelope.
3. To provide, in an automobile diaper of the kind described, an envelope comprising upper and lower panels, with the upper panel being formed with an opening leaving marginal portions thereabout.
4. To provide, in an automobile diaper of the character aforesaid, an envelope in which the inner layer is of plastic and the outer layer is of fiberglass and completely covers the inner layer and the opening in a panel thereof.
5. To provide, in an automobile diaper of the kind mentioned, an envelope having grommets adjacent to its periphery which are used in securing the diaper in position beneath an automotive device from which oil is likely to drip.

Various other more detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing an automobile diaper comprising a double-layer envelope of rectangular shape with each layer including upper and lower panels which are integrally joined along a fold line. The inner layer is of a thin plastic material and the upper panel thereof is formed with a central opening of rectangular shape leaving marginal portions thereabout. The outer layer is of fiberglass and covers the aforesaid opening and marginal portions. The envelope is filled with a mass of oil-absorbent material and is preferably a fireproof material. The three edges of the upper and lower panels apart from the fold line are secured together by heat sealing. A plurality of grommets are provided along each peripheral edge of the envelope to accommodate wires or other fastening devices which are used in securing the diaper in position.

For a full and more complete understanding of the invention, reference may be had to the following description and the accompanying drawing wherein:

FIG. 1 is a perspective of an automobile diaper embodying the precepts of the present invention;

FIG. 2 is a transverse vertical section taken on the plane of the line 2—2 of FIG. 1;

FIG. 3 is a perspective illustrating the two layers of the envelope with the panels thereof in a flattened out condition which they assume before being folded into the envelope formation, and FIG. 4 is a perspective similar to FIG. 3 depicting how the panels are folded.

DESCRIPTION OF THE EMBODIMENT

Referring now to the drawing wherein like reference characters denote corresponding elements throughout the several views, and first more particularly to FIG. 3, a piece of thin plastic, such as polyethylene having a thickness in the order of 6 mils, is referred to in its entirety by the reference character 10. The plastic piece 10 includes an upper panel 11 of rectangular shape which is formed with a central opening 12, also of rectangular shape and generally corresponding in shape to the panel 11. The formation of this opening 12 leaves a marginal portion 13 about each edge threof.

Integrally joined to upper panel 11 by a fold line 14 is a bottom panel 15 which it is noted is wider than upper panel 11, this difference in width being delineated by side strips 16. It is also longer than panel 11 with the difference in length being indicated by an end strip 17.

A piece of fiberglass netting is indicated generally at 18 and comprises an upper panel 19 of substantially the same size and shape as panel 11, and a lower panel 20 which is integrally joined to panel 19 at fold line 21. Fiberglass panel 20 is of substantially the same size and shape as bottom panel 15.

While FIG. 3 illustrates the plastic piece 10 and fiberglass netting 18 in spaced relation, it will be understood that they are placed in face-to-face engagement and folded along the lines 14 and 21 to assume the partially closed position depicted in FIG. 4. A mass of oil-absorbent material, such as shown at 22 in FIG. 2, is now inserted between panels 11 and 15 of the inner plastic layer. Side strips 16 of bottom panels 15 and 20 are then folded inwardly over peripheral portions of side margins 13, and end strip 17 of bottom panels 15 and 20 folded inwardly over the peripheral end portion of end margin 13. After being so-folded, the three edges of the envelope are secured together by heat and pressure in a well known manner.

Referring now more particularly to FIG. 1, the envelope is identified in its entirety by the reference character 23 and contains the mass of absorbent material 22, which, it will be noted from FIG. 2, extends outwardly and occupies the space beneath the marginal portions 13. The absorbent material 22 is preferably fireproof. Materials found suitable for the purpose are fiberglass insulation and rockwool. Due to the protective effects afforded by marginal portions 13 and the fiberglass netting, it is possible and entirely practical to employ absorbent materials other than those specified, as aspen wood and the like.

The envelope 23 presents four edges 24 and four corners 25. An eyelet or grommet 26 is incorporated into the envelope structure at each of the four corners 25 and midway each of the side edges 24. These grommets are availed of to secure the envelope 23 in position beneath the particular automotive device which is to be protected from dripping oil. As an example of a securing means which is used in conjunction with grommets 26, pieces of wire 27 are illustrated in FIG. 1. It will be understood that springs or other known comparable devices may be used for this purpose.

As mentioned under the heading Background of the Invention, it is intended that one of these envelopes be secured in position beneath any or all of the oil drip pan, transmission, differential or power steering, as occasion demands, and the envelope will be dimensioned for the particular place of its intended installation. By way of example, one size of diaper which has been found suitable for positioning beneath one of these elements has an overall dimension of 1 inches × 13 inches, with the opening 12 being 7 inches × 9 inches. It will be understood that these dimensions will vary.

Due to the fact that envelope 23 and mass of absorbent material 22 are flexible, it may be installed in its proper position with a high degree of facility and to accurately fit the automotive structure at its particular place of usage. The opening 12 is sufficiently large to receive any dripping oil while the overall dimensions and particularly the spaces beneath marginal portions 13 provide space for receiving an adequate amount of the absorbent mass 22. Marginal portions of this mass are protected by the marginal portions 13 of the fiberglass netting from sparks or other incendiary sources.

The operation and mode of usage of the subject automobile diaper are believed to be obvious from the illustrations of the drawing and description of parts set forth above; however it may be briefly noted that one of the envelopes 23 is installed at the particular location desired by wires 27 or comparable securing means and left in this position until the mass of absorbent material 22 has become saturated. Due to the size of this mass, one of these diapers will have a prolonged period of service usage under normal conditions. It is recognized that some of the automotive devices with which the diapers are used will drip more oil than others and the service life of a particular diaper will depend on the degree to which oil is dripped thereonto.

While a preferred specific embodiment is herein disclosed, it is to be clearly understood that the invention is not to be limited to the exact construction, dimensions and materials illustrated and described because various modifications of these details may be provided in putting the invention into practice.

What is claimed is:

1. An automobile diaper intended for installation beneath an automotive device containing oil under pressure and which presents the liability of oil dripping therefrom, said diaper comprising:
   a. a rectangular envelope consisting of an inner layer of plastic and an outer layer of fiberglass netting;
   b. said envelope including upper and lower panels secured together along their edges;
   c. the upper panel of said inner layer having a central rectangular opening with marginal portions thereabout;
   d. a mass of oil-absorbent material in said envelope and occupying the space between said opening and the spaces beneath said marginal portions, and
   e. a plurality of grommets incorporated into said envelope along each edge thereof.

2. The automobile diaper of claim 1 in which said mass of oil-absorbent material is non-combustible.

3. The automobile diaper of claim 2 in which said mass of oil-absorbent material is fiberglass insulation.

4. The automobile diaper of claim 1 in which the upper and lower panels of each layer are integrally joined along one edge of each of said panels.

5. The automobile diaper of claim 4 in which the bottom panels of both the inner and outer layers are wider and longer than said upper panels and present side and end strips which are folded over corresponding portions of said upper panels and sealed thereto.

6. The automobile diaper of claim 1 in which said envelope includes four side edges and four corners and there is one of said grommets at each corner and midway of each side edge.

* * * * *